United States Patent [19]

Andersson

[11] Patent Number: 4,895,382
[45] Date of Patent: Jan. 23, 1990

[54] DISTRIBUTION SYSTEM

[75] Inventor: Kjell Andersson, Löddeköpinge, Sweden

[73] Assignee: AB Tetra Pak, Lund, Sweden

[21] Appl. No.: 298,242

[22] Filed: Jan. 17, 1989

Related U.S. Application Data

[63] Continuation of Ser. No. 104,946, Oct. 6, 1987, abandoned.

[30] Foreign Application Priority Data

Oct. 17, 1986 [SE] Sweden ................................ 8604421

[51] Int. Cl.$^4$ ............................................ B62D 39/00
[52] U.S. Cl. ................................ 280/33.991; 280/639; 280/79.3; 211/85; 211/88; 211/149; 211/195; 312/132; 312/262; 312/126; 312/338; 312/350
[58] Field of Search ................... 280/33.991, 638, 639, 280/47.35, 33.992, 33.996, 33.995, 79.3; 211/85, 88, 130, 149, 195; 312/122, 132, 262, 126, 128, 283, 285, 330, 338, 350

[56] References Cited

U.S. PATENT DOCUMENTS

| | | | |
|---|---|---|---|
| 2,037,881 | 4/1936 | Clark ..................................... | 312/122 |
| 2,583,931 | 1/1952 | Cummings ........................... | 312/262 |
| 2,761,568 | 9/1956 | Temple ................................. | 211/85 |
| 3,222,117 | 12/1965 | Schwartz ............................. | 312/350 |
| 3,576,259 | 4/1971 | Leath ................................... | 211/149 |
| 3,698,782 | 10/1972 | Onori ................................... | 312/350 |
| 3,729,242 | 4/1973 | Barney ............................. | 312/350 X |
| 3,797,842 | 3/1974 | Swick, Jr. et al. ............... | 280/47.35 |
| 3,840,242 | 10/1974 | Craig, Sr. et al. .......... | 280/33.99 H |
| 3,840,243 | 10/1974 | Rheinhart et al. .......... | 280/33.99 H |
| 3,966,286 | 6/1976 | Groseclose .................... | 312/262 X |
| 3,977,689 | 8/1976 | Rosa .................................... | 280/79.3 |
| 4,123,128 | 10/1978 | Abele .................................. | 312/132 |
| 4,457,436 | 7/1984 | Kelley .................................. | 211/88 |
| 4,588,096 | 5/1986 | Story et al. ................... | 280/79.3 X |
| 4,624,509 | 11/1986 | Ramsey .......................... | 312/122 X |
| 4,725,066 | 2/1988 | Nootenboom et al. ........... | 280/79.3 |

FOREIGN PATENT DOCUMENTS

| | | | |
|---|---|---|---|
| 613175 | 1/1961 | Canada .............................. | 312/122 |
| 708827 | 5/1965 | Canada .............................. | 211/195 |
| 0106703 | 4/1984 | European Pat. Off. . | |
| 2252765 | 5/1973 | Fed. Rep. of Germany ... 280/33.99 R | |
| 2333453 | 1/1974 | Fed. Rep. of Germany ... 280/33.99 H | |
| 2528784 | 12/1983 | France . | |
| 7101915 | 12/1974 | Sweden . | |
| 1132148 | 10/1968 | United Kingdom ............. | 280/79.3 |

*Primary Examiner*—Charles A. Marmor
*Assistant Examiner*—Tamara L. Finlay
*Attorney, Agent, or Firm*—Burns, Doane, Swecker & Mathis

[57] ABSTRACT

A distribution system comprises box-shaped transport containers, (5) each provided with a bottom (18) and walls (20), and a truck (1) provided with wheels and having swinging side walls (3 and 4) in hinged connection with a vertical end wall (2). The side walls (3 and 4) have supporting elements placed oppositely in pairs, e.g. horizontal L-shaped rails (22) which are positively engageable with members formed on the transport trays (5), e.g. channels (21). The channel members are incorporated at the bottom (18) of the transport trays, to facilitate in cooperation with the L-shaped rail members loading by insertion of the transport trays (5) and securing of the side walls (3 and 4) when the side walls are in their active position.

6 Claims, 2 Drawing Sheets

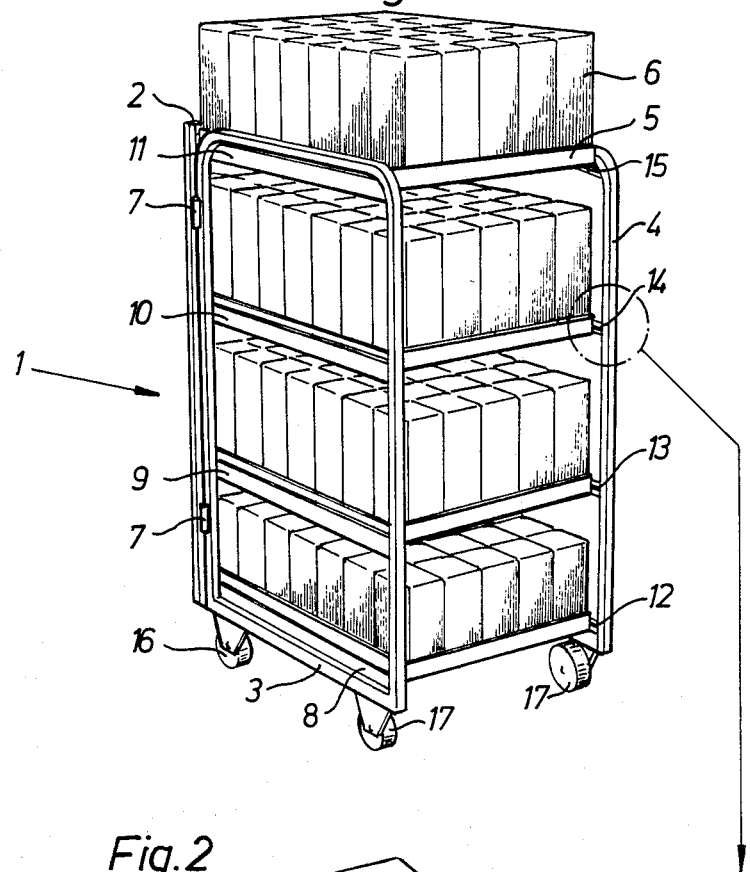
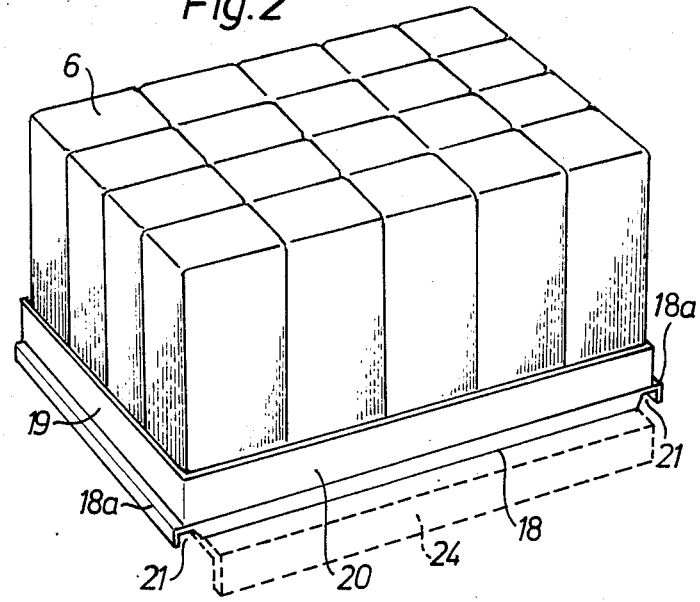

DISTRIBUTION SYSTEM

This application is a continuation of application Ser. No. 104,946, filed Oct. 6, 1987, now abandoned.

The present invention relates to a distribution system for use in transporting and displaying goods such as dairy products. A truck is adapted to swing between an active, lockable position when the side walls thereof are parallel with one another and situated at right-angles to the end wall of the truck, to a swung-out free position with the side walls somewhat diverging from the end wall.

BACKGROUND OF THE INVENTION

The transport of dairy goods, e.g. milk packages, from dairies to shops frequently takes place with the help of a distribution system comprising a truck of the type as described above. The truck is filled with the goods in question at the dairy whereupon it is rolled up onto a distribution van and conveyed to the shop. On arrival the truck is rolled directly to the selling point, where customers successively empty the truck. When the truck has been emptied it is replaced by a new, full truck and returned to the dairy where it is filled again. The storage of empty trucks in a space-saving manner is facilitated in that two of the side walls which are parallel in a loaded position of the truck, are adapted to be swung somewhat outwardly from one another to a free position, whereafter a number of similar trucks can be slid into each other so that they can be stored on a limited floor-area while awaiting return transport to the dairy for new filling.

The known systems, with or without transport trays, have several serious disadvantages. It is assumed by them, for example, that the side walls of the truck will be capable of acting as lateral supports protecting and holding together the load in the loading space of the truck, and in order to be able to fulfill this function in an appropriate satisfactory manner it was previously essential, therefore, to dimension the total available load volume so that the load of goods would be able practically completely to fill out this space. According to the dimensions and shape of the goods the known distribution systems thus required more or less "tailor-made" trucks so as to fit the particular goods in each individual case. This requirement made the known systems clumsy to some extent, since it was not possible to utilize a standardized truck, that is to say a uniform truck for all types of goods irrespective of their size, whose side walls at same time would be able to act as a support both protecting and holding together the load of goods in a satisfactory manner.

A further disadvantage of the known distribution systems is that the truck usually was provided with some kind of mechanical locking arrangement, e.g. of the type comprising elements engaging one another on parts of the truck which are movable in relation to one another, in order to lock the swinging side walls of the truck in the active position and thereby prevent these walls from unintentionally swinging away from each other when the truck is loaded with goods. Such locking arrangements as a rule are very sensitive to mechanical influences such as jolts and impacts which may occur during the handling of the truck and which often may damage the locking arrangement and even render the truck unusable.

In accordance with the present invention it has been found, however, that many of these disadvantages of the known distribution systems can be eliminated if the truck is more or less freed from certain of their previously necessary functions, such as the supporting function and the locking function.

OBJECTS AND SUMMARY OF THE INVENTION

It is an object of the present invention, therefore, to produce a distribution system, especially for dairy goods such as milk packages, of the type described earlier but which unlike the known system makes it possible to use a uniformly standardized truck irrespectively of size and shape of the particular goods.

It is another object to produce a distribution system comprising a truck provided with swinging side walls, which can be secured in their active position without the use of sensitive mechanical locking arrangements.

It is yet another object to produce an inexpensive, easily managed distribution system comprising a bottomless, easy-care (easily cleaned) truck with a minimum number of movable parts and with practically completely open side walls.

These as well as further objects have been achieved in accordance with the invention in that a distribution system of the known type described earlier has been given the characteristic that swinging side walls of the truck are provided with supporting members placed oppositely in pairs intended to support loaded transport trays, and that the transport trays are provided with outward members which are adapted so that in cooperation with the supporting members they secure the side walls in the active position.

BRIEF DESCRIPTION OF THE DRAWING

A distribution system in accordance with a simple, preferred embodiment of the invention will now be described in more detail with special reference to the attached drawing, wherein FIG. 1 is a schematic perspective view of a truck in an active position, FIG. 2 is a schematic perspective view of a filled transport tray included in the system, FIG. 3 is an enlarged partial view of the ringed detail in FIG. 1.

DETAILED DESCRIPTION OF A PREFERRED EMBODIMENT

Figure 4:
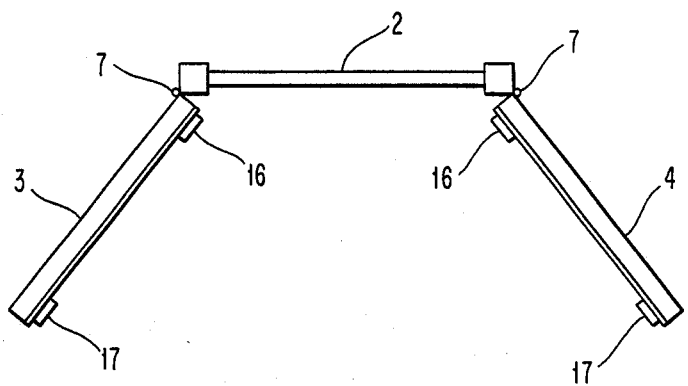
FIG. 4 is a top view of a truck in a free position.

The truck 1 shown in FIG. 1 has a rear, vertical (partly concealed) end wall 2 and two side walls 3,4. The truck 1 is in its active position, that is to say the position in which it is loaded or ready to be loaded with transport trays filled with goods 6, and the two side walls 3 and 4 are then parallel with each other and positioned right-angled to the end wall 2. The two side walls are joined to the end wall 2 by means of vertical hinges 7 in such a manner that they can be swung out from the active position shown to a swung-out free position, as shown in FIG. 4, wherein the side walls 3,4 diverge somewhat from each other. In this position a number of similar trucks can thus be slid into one another and be stored in a space-saving manner.

Since the walls 2–4 of the truck 1 in accordance with the present invention no longer have to function as support of the loaded goods 6, they can be given a relatively simple and open design which makes the goods clearly visible and accessible from all four directions. The walls 2-4, as shown in FIG. 1, may suitably consist of a rectangular metal frame each, and so as to increase the stability of the metal frames forming the side walls 3 and 4 these preferably may be provided with a number of additional, preferably freely adjustable cross bars 8-15 placed oppositely in pairs.

The truck 1, moreover, is provided at the bottom with a rear and front pair of wheels 16,17 which may be pivoted.

In FIG. 2 is shown an example of a transport tray 5 in accordance with the invention. The transport tray may be designed as a rectangular box open at the top with a bottom 18 and edge and side walls 19 and 20 respectively placed oppositely in pairs. As is evident from FIG. 2 the bottom 18 is a little longer than the side walls 20 and is provided with edge portions 18a projecting at the respective end walls 19. The edge portions 18a comprise channels 21 open at the bottom which extend parallel with the end walls 19 along the whole of their length.

As is evident in greater detail from FIG. 3, a horizontal, L-shaped rail 22 is fitted to the inside of respective cross bars 14 of the truck 1 which extends practically along the whole length of the cross bars so as to form a continuous guide channel 23 between the cross bar and the vertical leg of the respective rail 22.

When the truck 1 is to be loaded with transport trays 5 filled with goods 6 the procedure is as follows: The side walls 3 and 4 of the truck are first adjusted to the active position with the side walls parallel with one another and positioned right-angled to the end wall 2, whereafter a transport tray 5 is inserted into the truck with the edge portions 18a and the rails 22 in the positive engagement with one another shown in FIG. 3, as a result of which the side walls 3 and 4 are secured in the active position. In order to make possible such a positive engagement between the edge portions 18a and the rails 22 the distance between the channels 21 in the bottom 18 of the transport trays must correspond to the distance between the vertical legs of two rails situated opposite one another.

As mentioned earlier it is possible in accordance with the present invention to use one and the same truck for the transport of goods 6 filled into transport trays 5 irrespectively of the size and shape of the actual goods. Whereas it was necessary previously to adapt the dimensions of the known trucks (that is to say the available loading area of the truck), it is sufficient in accordance with the invention for a corresponding adaptation to be made of the area situated within the edge and side walls 19 and 20 respectively of the transport trays (that is to say the available loading area of the transport trays), whilst the outer dimensions of the bottom 18 of the transport trays 5 can be constant, so that it will be possible in accordance with the invention to obtain a uniform distribution system.

The transport trays 5, as indicated by broken lines in FIG. 2, may also be provided with side pieces 24 at the bottom 18 between the edge portions 18a which project outwards laterally from the side walls 20 of the transport trays. Such side pieces are intended to prevent axial displacement of a goods load on a transport tray positioned straight underneath or inserted into the truck 1 by gripping around the top part of the goods load. Furthermore, the transport trays can be made of plastic material in one single piece by injection moulding which means that the trays will be light, inexpensive and easy to handle.

While this invention has been illustrated and described in accordance with a preferred embodiment, it is recognized that variations and changes may be made and equivalents employed herein without departing from the invention as set forth in the claims.

What is claimed is:

1. A system for distributing and displaying goods comprising:
    a truck having:
        a vertical end wall;
        two side walls in hinged connection with said end wall so as to be swingable between an active lockable position wherein said side walls are parallel with one another and are substantially perpendicular to said end wall and a free position wherein said side walls diverge from said end wall;
        each of said side walls including a rectangular frame defining the outer edges of the side wall;
        a plurality of pairs of horizontal cross bars mounted in opposing manner on said side walls, said side walls being substantially open between the cross bars so as to permit access to the interior of the truck;
        said cross bars being formed by L-shaped horizontal rails extending along substantially the entire width of said side walls of said truck, said rails projecting inwardly from said side walls; and
        wheels on which said truck is supported; and
    a plurality of transport trays, each tray having a bottom and a pair of edge portions projecting beyond the tray bottom, said edge portions being arranged on opposite sides of the tray bottom and said edge portions including open channels arranged in the underside thereof so as to form outward extending means for slidably engaging said L-shaped rails to enable said tray to be slid into said truck from the side of the truck opposite said vertical end wall and to support said transport tray on said truck and to secure said side walls of said truck in said active lockable position.

2. The system of claim 1, wherein said horizontal rails project inwardly from said side walls a distance sufficient to permit said trays to be slid horizontally into said truck along said rails without contacting the side walls.

3. A system for distributing and displaying goods comprising:
    a truck having a vertical end wall, two side walls in hinged connection with said end wall so as to be swingable between an active lockable position wherein said side walls are parallel with one another and are substantially perpendicular to said end wall and a free position wherein said side walls diverge from said end wall, and wheels on which said truck is supported;
    said side walls including a plurality of pairs of opposing supporting members formed by L-shaped horizontal rails extending along substantially the entire width of said side walls of said truck, said rails projecting inwardly from said side walls; and
    a plurality of transport trays, each tray having a bottom and a pair of edge portions projecting beyond the tray bottom, said edge portions being arranged on opposite sides of the tray bottom and said edge portions including open channels arranged in the underside thereof so as to form outward extending means for slidably engaging said rails to enable said tray to be slid into said truck from the side of the truck opposite said vertical end wall and to support said transport tray on said truck and to secure said side walls of said truck in said active lockable position.

4. The system of claim 3, wherein said horizontal rails project inwardly from said side walls a distance sufficient to permit said trays to be slid horizontally into said truck along said rails without contacting the side walls.

5. A system for distributing and displaying goods comprising:
- a truck having a vertical end wall, two side walls in hinged connection with said end wall so as to be swingable between an active lockable position wherein said side walls are parallel with one another and are substantially perpendicular to said end wall and a free position wherein said side walls diverge from said end wall, and wheels on which said truck is supported;
- said side walls including opposing supporting members formed by L-shaped horizontal rails extending along substantially the entire width of said side walls of said truck, and rails projecting inwardly from said side walls; and
- at least one box-shaped transport tray having a tray bottom, tray walls, and a pair of edge portions projecting horizontally from the tray bottom, said edge portions being arranged on opposite sides of the tray bottom and said edge portions including open channels arranged in the underside thereof so as to form outwardly extending means for slidably engaging said rails to enable said tray to be slid into said truck from the side of the truck opposite said vertical end wall and to support said transport tray on said truck and to secure said wide walls of said truck in said active lockable position, said tray further including a panel extending downward from one edge of the tray bottom.

6. The system of claim 5, wherein said horizontal rails project inwardly from said side walls a distance sufficient to permit said tray to be slid horizontally into said truck along said rails without contacting the side walls.

* * * * *